United States Patent

Hill

[11] 3,987,720
[45] Oct. 26, 1976

[54] NO DRIP PIE PLATE
[75] Inventor: Geraldine A. Hill, Sutton West, Canada
[73] Assignee: The Raymond Lee Organization, Inc., New York, N.Y.
[22] Filed: Sept. 15, 1975
[21] Appl. No.: 613,174

[52] U.S. Cl. .............................. 99/433; 99/DIG. 15; 99/444
[51] Int. Cl.² ..................... A47J 27/58; A47J 37/01
[58] Field of Search ............. 99/444, 375, 400, 408, 99/425, 428, 430–431, 433, DIG. 15; 126/385; 220/74

[56] References Cited
UNITED STATES PATENTS

| 1,612,551 | 12/1926 | Twohey | 126/385 |
| 2,237,697 | 4/1941 | Brown | 99/DIG. 15 |
| 2,570,060 | 10/1951 | Johnson | 99/428 |
| 2,811,152 | 10/1957 | Wicks | 126/385 |
| 3,431,836 | 3/1969 | Murrell | 99/444 X |
| 3,438,543 | 4/1969 | Buff, Jr. | 220/74 |

Primary Examiner—Peter Feldman
Assistant Examiner—Arthur O. Henderson
Attorney, Agent, or Firm—Stephen Wyden

[57] ABSTRACT

A pie plate which has a lip which extends as a flap that is folded down on the outside of the pie plate and can be lifted to retain the juices from a pie cooking therein.

1 Claim, 4 Drawing Figures

NO DRIP PIE PLATE

I have invented an improved pie plate to be used where there is a danger that the pie juices will drip off the plate, especially while baking, causing spattering and soiling of the oven and fire hazards, the plate can also be used to partially protect the finished pie after baking.

My pie plate can be understood in view of the accompanying figures.

Figure 1:
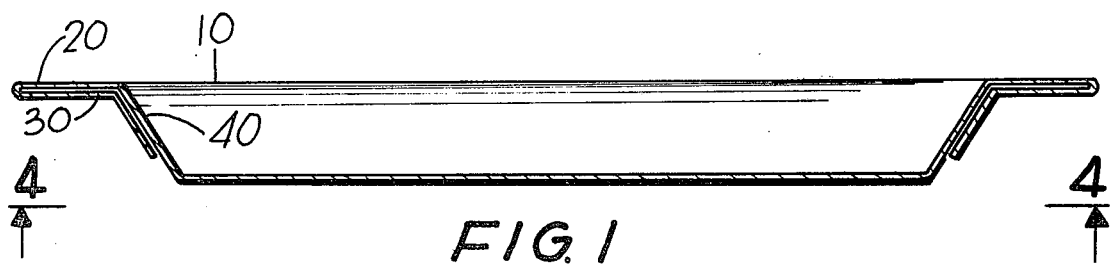
FIG. 1 is a cross-sectional view of the improved pie plate in the form it is manufactured.

In FIG. 1, the pie plate 10 has a lip 20, the outer edge of which is extended as a flexible foil flap 30 that comes folded down against the bottom of the lip 20 and the side 40 of the pie plate.

Figure 2:
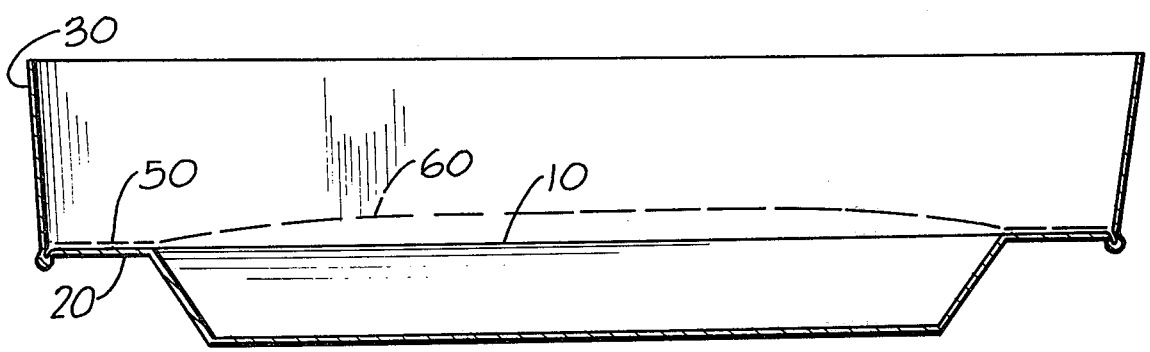
FIG. 2 is a cross-sectional view of the pie plate with the edges lifted to retain the juices in the pie.

In FIG. 2, the flexible foil flap 30 of the pie plate 10 has been lifted so that any juices formed 50 from a pie 60 cooking in the oven will be retained on the edge 20 of the pie plate 10.

Figure 3:
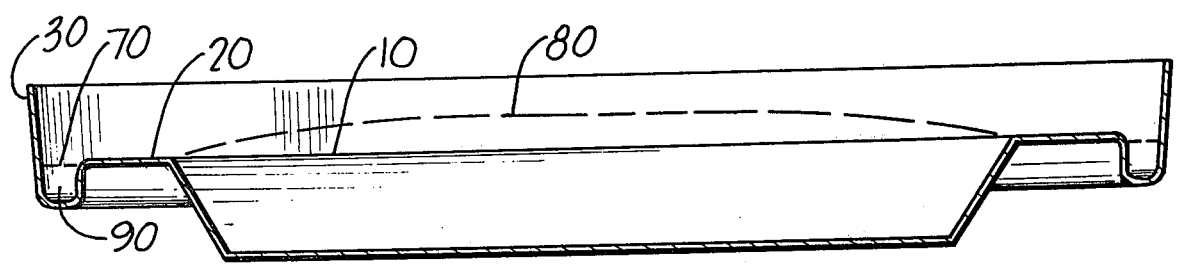
FIG. 3 is a cross-sectional view of the pie plate with the edges folded to drain and retain the juices bubbling out of the pie as it is cooking in the oven.

In FIG. 3, the flexible foil flap 30 of the pie plate 10 has been folded so that any juices formed 70 from a pie 80 cooking in the oven will be drained off the edge 20 of the pie plate 10 into the reservoir 90 formed and retained therein.

Figure 4:
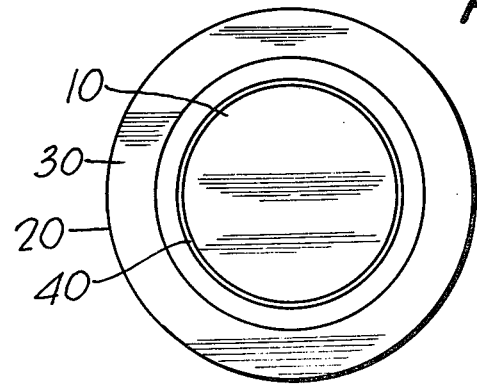
FIG. 4 is a view of the pie plate in FIG. 1 taken in the plane 4—4 showing the folded down edge.

In FIG. 4, the pie plate 10 foil flap 30 is folded against the lower surface of the pie plate 10 from the edge of the lip 20 inward and down the side 40 of the pie plate 10.

Having described a preferred embodiment of my invention, it is understood that various changes can be made without departing from the spirit of my invention, and, I desire to cover by the appended claims all such modifications as fall within the true spirit and scope of my invention.

What I claim and seek to secure by Letters Patent is:

1. A no drip pie plate, comprising a standard pie plate, wherein:

a flexible foil flap radially extends from the outer edge of the lip and is folded down against the bottom of the lip and on a side of the pie plate, whereby the flap can be lifted to retain juices from a pie placed in the pie plate.

* * * * *